US008025945B2

(12) United States Patent
Koike

(10) Patent No.: US 8,025,945 B2
(45) Date of Patent: *Sep. 27, 2011

(54) EASILY PEELABLE LAMINATED FILM

(75) Inventor: Hiroshi Koike, Kashima-gum (JP)

(73) Assignee: Yupo Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/653,977

(22) Filed: Jan. 17, 2007

(65) Prior Publication Data

US 2007/0116914 A1 May 24, 2007

Related U.S. Application Data

(63) Continuation of application No. 10/335,950, filed on Jan. 3, 2003, which is a continuation-in-part of application No. PCT/JP01/05850, filed on Jul. 5, 2001.

(30) Foreign Application Priority Data

Jul. 5, 2000 (JP) .................. 2000-203400

(51) Int. Cl.
*B32B 9/00* (2006.01)
*B32B 3/00* (2006.01)
*B32B 7/14* (2006.01)

(52) U.S. Cl. ........... 428/40.1; 428/40.2; 428/41.3; 428/41.5; 428/41.7; 428/41.8; 428/42.1; 428/201; 428/204

(58) Field of Classification Search ........ 428/40.1, 428/40.2, 41.3, 41.5, 41.7, 41.8, 42.1, 201, 428/204

See application file for complete search history.

(56) References Cited

U.S. PATENT DOCUMENTS

| 3,364,049 | A | * | 1/1968 | Deak et al. ............ 428/203 |
| 4,764,403 | A | * | 8/1988 | Ajmera ................. 428/36.7 |
| 4,911,477 | A | * | 3/1990 | Shishido ................ 283/100 |
| 6,218,017 | B1 | | 4/2001 | Yamashita et al. |
| 6,346,565 | B1 | * | 2/2002 | Daifuku et al. ........... 524/436 |
| 6,576,325 | B1 | | 6/2003 | Yamanaka et al. |

FOREIGN PATENT DOCUMENTS

| EP | 0715953 | A2 | | 6/1996 |
| EP | 1041529 | A1 | | 10/2000 |
| EP | 1055715 | A1 | | 11/2000 |
| JP | 62-53138 | | | 2/1987 |
| JP | 7-17166 | | | 1/1995 |
| JP | 8-30202 | | | 2/1996 |
| JP | 8-99377 | | | 4/1996 |
| JP | 10-258476 | | * | 9/1998 |
| JP | 10258476 | A | * | 9/1998 |

OTHER PUBLICATIONS

English translation of JP 10-258476.*
English translation of JP 10258476.*

* cited by examiner

*Primary Examiner* — Victor S Chang
(74) *Attorney, Agent, or Firm* — Sughrue Mion, PLLC

(57) ABSTRACT

An easily peelable laminated film includes a laminate of a peelable surface layer (B) having a peeling strength of 5 to 100 g/cm with a base layer (A) containing a thermoplastic resin. The laminated film of the invention provides an easily peelable laminated film excellent in water resistance as a base material for, for example, concealing seals and labels for preventing re-pasting. The easily peelable laminated film of the invention requires no specific process to start peeling.

12 Claims, No Drawings

EASILY PEELABLE LAMINATED FILM

This application is a continuation of U.S. patent Ser. No. 10/335,950 filed Jan. 3, 2003. This application is a continuation in part of PCT/JP01/05850 filed Jul. 5, 2001.

TECHNICAL FIELD

The present invention relates to an easily peelable laminated film comprising a laminate of a base layer (A) comprising a thermoplastic resin, and a peelable surface layer (B) weaker in strength than the base layer (A).

An easily peelable laminated film is useful as a base material of, for example, delivery slips, concealing seals of post cards and passbooks, labels for preventing re-pasting, seals for preventing alteration, application seals, and coupons free of remaining adhesives.

BACKGROUND OF THE INVENTION

There has been conventionally such a problem in the salesroom of foods in supermarkets and department stores that there are persons who peel off the pressure-sensitive adhesive price label of lowered price from the foods on sale nearing eatable limit and replace this price label with the price label of foods of normal price and purchase the foods at a cheaper price.

Therefore, a label for preventing re-pasting which is easily known to be the peeled label after peeling and re-pasting the label on other goods, or a label which cannot be re-pasted is required and such a label has been put to practical use. However, there are problems that these labels for preventing re-pasting are expensive, an adhesive remains on the peeled surface and sticky to the touch, or dusts are adhered on the surface.

For solving this problem, Japanese Patent Laid-Open No. 99377/1996 discloses a method of manufacturing a label for preventing re-pasting, which label satisfies the equation c<a<b, taking the force required to peel off a first layer from a second layer by a peeling agent as a, the adhesive force of an adhesive layer with the material to be adhered as b, and the force required to peel off a peelable sheet from the adhesive layer as c, and the method comprises (a) a step of forming an adhesive layer on a peelable sheet, (b) a step of laminating a peeling agent layer containing a wax on one main surface of a first layer, (c) a step of forming a second layer on the surface of the peeling agent layer of the first layer, and (d) a step of superposing and laminating the surface of the adhesive layer formed on the peelable sheet and the surface of the second layer laminated on the first layer. However, this method is not only complicated but also inferior in water resistance when paper made of pulp is used as the surface material of the first layer, so that the surface material is easily broken and peeled off from the material adhered when it is brought into contact with water. Therefore, this label is not suited to be a label for a sealed vessel containing water, e.g., pickles, tofu (bean curd), konjak (devil's tongue), etc.

Further, Japanese Patent Laid-Open No. 258476/1998 discloses a method of obtaining a film for a label to prevent re-pasting which is excellent in water resistance comprising a fusion-laminated base layer (A) comprising a thermoplastic resin film having a thickness of from 10 to 500 μm and a backing layer (C) on the front surface and back surface of a peelable surface layer (B) comprising a thermoplastic biaxially stretched film containing from 10 to 80 wt % of an inorganic fine powder and from 90 to 20 wt % of a thermoplastic resin. The base layer (A) and the backing layer (C) of the easily peelable laminated film obtained by this method can be easily peeled once peeling starts, but it has been found that a specific process, e.g., cutting a notch or a slit only on the backing layer (C), is necessary to surely start peeling.

Accordingly, an object of the present invention is to solve the problems of background techniques and provide an easily peelable laminated film having very excellent characteristics.

That is, an object of the present invention is to provide an easily peelable laminated film which is excellent in water resistance as a base material for concealing seals and labels for preventing re-pasting and which requires no specific process to start peeling.

DISCLOSURE OF THE INVENTION

As a result of eager investigation for solving these problems, the present inventors have found that an easily peelable laminated film (i) having excellent characteristics can be obtained by forming a thermoplastic resin film having a specific layer constitution, thus accomplishing the present invention.

That is, the present invention provides an easily peelable laminated film (i) which requires no specific process to start peeling by laminating a peelable surface layer (B) having a peeling strength of from 5 to 150 g/cm, and a base layer (A) comprising a thermoplastic resin.

As the preferred mode of the present invention, a base layer (A) and a peelable surface layer (B) that is a stretched film are stretched at least in the monoaxial direction after being laminated, the peelable surface layer (B) comprises a thermoplastic resin, the peelable surface layer (B) contains from 10 to 80 wt % of an inorganic fine powder and/or an organic fine powder, and from 90 to 20 wt % of a thermoplastic resin, the peelable surface layer (B) has a layer thickness of from 0.1 to 100 μm and the base layer (A) has a layer thickness of from 10 to 500 μm.

Further, the easily peelable laminated film (i) preferably has an opaqueness of from 60 to 100%. Still further, the base layer (A) preferably has a laminated structure. A preferred laminated structure for the base layer (A) is constructed as follows: a layer (A1) contiguous to the peelable surface layer (B) comprises a thermoplastic resin film containing from 2 to 60 wt % of an inorganic fine powder and/or an organic fine powder, and from 98 to 40 wt % of a thermoplastic resin, the content of the inorganic fine powder and/or the organic fine powder in the layer (A1) being less than that in the peelable surface layer (B) by 8 wt % or more, and an outer layer (A2) next to the layer (A1) comprises a thermoplastic resin film containing from 0 to 80 wt % of an inorganic fine powder and/or an organic fine powder, and from 100 to 20 wt % of a thermoplastic resin.

It is preferred to provide a protective layer on the outside of the peelable surface layer (B). Also, it is preferred to provide a coat layer on at least one side of the easily peelable laminated film (i).

Further, the laminated film of the present invention may be an easily peelable laminated label (ii), wherein an adhesive is provided on the side of the peelable surface layer (B) opposite to the base layer (A) in the easily peelable laminated film (i), or may be an easily peelable laminated label (ii), wherein a pressure-sensitive adhesive and a release paper in this order are provided on the side of the peelable surface layer (B) opposite to the base layer (A), and it is preferred that the peeling start stress of the easily peelable label is preferably 500 g/cm width or less.

By peeling the base layer (A) off from the easily peelable laminated label (ii), the letters (characters) and/or the graphic data provided under the peelable surface layer (B) and/or the pressure-sensitive adhesive are recognizable.

BEST MODE FOR CARRYING OUT THE INVENTION

The easily peelable laminated film according to the present invention is described in further detail below.

As described above, the laminated film according to the present invention is an easily peelable laminated film comprising a base layer (A) and a peelable surface layer (B) and, if desirable, a pressure-sensitive adhesive layer, a release paper, or other laminated films may be provided.

[Peelable Surface Layer (B)]

The peelable (back) surface layer (B) in the present invention is a layer which is weak in strength (i.e., both in tensile and tear strengths) and the layer itself is easily subject to cohesive failure so that the base layer (A) is easily peeled with a hand (fingers) by the cohesive failure in the peelable surface layer (B).

The peelable surface layer (B) can be formed by various methods and it is possible to obtain more stable peelability by adding an inorganic fine powder and/or an organic fine powder to the peelable surface layer (B). The content of the inorganic fine powder and/or the organic fine powder added to the peelable surface layer (B) is from 10 to 80 wt %, and more preferably from 15 to 75 wt %. When the content of the inorganic fine powder and/or the organic fine powder contained in the peelable surface layer (B) is less than 10 wt %, sufficient peelability cannot be obtained, and when the content exceeds 80 wt %, forming stability is impaired.

Further, the peelable surface layer (B) is preferably a stretched resin film layer. It is possible to obtain a peelable surface layer (B) having a more uniform thickness if the resin film is subjected to stretching.

The resin components constituting the peelable surface layer (B) are preferably thermoplastic resins which are easily formed by stretching.

As the thermoplastic resins, suitable resins include polyolefin series resins, e.g., ethylene series resins such as high density polyethylene, medium density polyethylene and low density polyethylene, propylene series resins, polymethyl-1-pentene and ethylene-cyclic olefin copolymers; polyamide resins, e.g., nylon-6, nylon-6,6, nylon-6,10 and nylon-6,12; thermoplastic polyester series resins, e.g., polyethylene terephthalate and the copolymers thereof, polyethylene naphthalate and aliphatic polyesters; polycarbonate; atactic polystyrene; syndiotactic polystyrene; and polyphenylene sulfide. These resins can be used as a mixture of two or more. Of these thermoplastic resins, it is preferred to use polyolefin series resins. Further, of the polyolefin series resins, propylene series resins and high density polyethylene are more preferably used in view of production costs, water resistance and chemical resistance.

As the examples of such propylene series resins, polypropylenes which are made from propylene monomers, and show isotactic or syndiotactic, or various stereoregularities, and copolymers of α-olefin, e.g., ethylene, butene-1, hexene-1, or heptene-1,4-methylpentene-1 with propylene as the main component are exemplified. These copolymers may be binary systems, ternary systems or quaternary systems, or may be random copolymers or block copolymers.

As the inorganic fine powders, those generally having a particle diameter of from 0.01 to 15 μm, preferably from 0.01 to 8 μm, and more preferably from 0.03 to 4 μm, are suitably employed. Specifically, calcium carbonate, calcined clay, silica, diatomaceous earth, talc, titanium dioxide, barium sulfate and alumina can be used.

As the organic fine powders, it is preferred to select resins of a different kind or kinds from the thermoplastic resin or resins employed as the main component of the film in which the organic fine powder is incorporated. For example, when polyolefin series resins are used as the thermoplastic resin, polyethylene terephthalate, polybutylene terephthalate, polycarbonate, nylon-6, nylon-6,6, cyclic olefin homopolymer, and cyclic olefin-ethylene copolymer having a melting point of from 120 to 300° C. or a glass transition temperature of from 120 to 280° C. are suitably used as the organic fine powders.

The peelable surface layer (B) preferably has a thickness of 0.1 to 100 μm, more preferably 0.2 to 80 μm, still more preferably 0.3 to 60 μm. When the thickness of the peelable surface layer (B) is less than 0.1 μm, sufficient peelability cannot be obtained, and when the thickness is more than 100 μm, there is no problem in the peeling strength but the transparency of the peelable surface layer (B) decreases, and information-recognizing performance decreases when the base layer (A) described later is peeled off. In addition, the peeled surface becomes uneven, so that a problem arises when the peeled base layer (A) is used as a management slip by type writing a bar code, etc.

[Base Layer (A)]

The base layer (A) itself is stronger both in tensile and tear strengths than that of the peelable surface layer (B), and peeling in the base layer (A) is not carried out when the base layer (A) is peeled off by taking it.

The same thermoplastic resins as described above for the peelable surface layer (B) can be used for the base layer (A). It is preferred that a thermoplastic resin film (i.e., the laminate of the base layer (A) and the peelable surface layer (B) as a whole) obtained from the thermoplastic resin for the base layer (A) be stretched at least in a monoaxial direction. The uniformity in thickness of the base layer (A), and the stiffness and tensile strength of the easily peelable laminated film (i) are improved by stretching; as a result, the mechanical strength necessary to processing and printing can be improved.

The base layer (A) preferably has a thickness of from 10 to 500 μm, more preferably from 20 to 300 μm. When the thickness is less than 10 μm, the breaking strength of the base layer (A) is low, and the base layer (A) may tear when the base layer (A) is peeled off from the peelable surface layer (B) (rather, from an adherend by the cohesion failure of the peelable surface layer (B)) by taking the base layer (A) and the desired performances of the invention cannot be exhibited. On the other hand, when the thickness of the base layer (A) exceeds 500 μm, the stiffness of the easily peelable laminated film (i) becomes excessive, and the processability and printability decrease when it is used as a concealing seal and a label for preventing re-pasting.

The base layer (A) may or may not contain an inorganic fine powder and/or an organic fine powder. The same inorganic fine powders and/or organic fine powders as described above for the peelable surface layer (B) can be used for the base layer (A). The inorganic fine powders and/or the organic fine powders for use in the base layer (A) and the peelable surface layer (B) may be the same or different.

The base layer (A) may be a multilayer structure of two layer structure, three layer structure or more. The number of stretching of the multilayer structure may be any of monoaxial/monoaxial, monoaxial/biaxial, biaxial/monoaxial, monoaxial/monoaxial/biaxial, monoaxial/biaxial/monoaxial, biaxial/monoaxial/monoaxial, monoaxial/biaxial/biaxial, biaxial/biaxial/monoaxial, and biaxial/biaxial/biaxial. However, the content of an inorganic fine powder and/or an organic fine powder in layer (A1) contiguous to the peelable surface layer (B) is preferably less than that in the peelable surface layer (B) by 8 wt % or more, more preferably by 10 wt % or more. When the difference in contents of the inorganic fine powder and/or organic fine powder in layer (A1) and layer (B) is less than 8 wt %, or the content in layer (A1) is higher than that in layer (B), the strength of layer (A1) is weaker than that of layer (B), and the desired performances of the invention cannot be exhibited. Further, it becomes possible to impart various performances to the easily peelable laminated film (i) by making the base layer (A) into a multilayer structure, e.g., writability, printability, thermal transferability, scratch resistance, secondary processability, and the like.

[Protective Layer]

It is also possible to provide a protective layer on the outside of the peelable surface layer (B) of the easily peelable laminated film (i) of the present invention. Since the peelable surface layer (B) in the present invention is a layer which is weak in strength, providing a protective layer may help prevent the peelable surface layer (B) from breaking during the manufacturing process or various processing stages.

As the thermoplastic resins which constitute the protective layer, the thermoplastic resins exemplified in the description of the base layer (A) can be used, and polyolefin series resins and functional group-containing polyolefin series resins are preferably used, as in the case of the base layer (A). Further, since it is desired that when the base layer (A) is peeled off, the protective layer should break easily and breaking is propagated to the peelable surface layer (B), resins having low breaking strength are preferably used as the protective layer. In the present invention, the balance of cohesive forces of the base layer (A), the pressure sensitive adhesive layer, the protective layer (if necessary), and the peelable surface layer (B) is set as follows: (the base layer (A))>(the pressure sensitive adhesive layer)>(the protective layer)>(the peelable surface layer (B)). As specific examples of such thermoplastic resins, ethylene series resins, propylene series resins, ethylene-unsaturated carboxylic acid copolymers, ethylene-acrylic acid copolymers, and graft-modified products of these resins are exemplified. The protective layer may or may not contain inorganic fine powders and/or organic fine powders, and excellent transparency can be obtained when little or no inorganic fine powders and/or organic fine powders are employed, and also the recognizability of the information provided under the protective layer is excellent when the base layer (A) is peeled off.

The protective layer is preferably a stretched resin film layer, and it is possible to obtain a protective layer having a thin and uniform thickness by stretching.

The thickness of the protective layer is preferably 0.1 μm or more and smaller than 10 μm, more preferably from 0.1 to 8 μm, and still more preferably from 0.2 to 6 μm. When the layer thickness is less than 0.1 μm, the protective layer cannot cover the peelable surface layer (B) entirely, so that the function of the protective layer is not exhibited. On the other hand, when the layer thickness is more than 10 μm, the peeling starting property of the peelable laminated label (ii) is impaired.

[Formation of Resin Film]

The method of forming a resin film is not especially restricted and various conventionally well-known methods can be used, specifically cast-formation of extruding a molten resin in a sheet-like form by using monolayer or multilayer T die(s) or I die(s) connected with an extruder, inflation-formation of extruding a molten resin in a tube-like form with a circular die and expanding the resin with internal air pressure, calender-formation of calendering kneaded material with a plurality of heat rollers and processing in a sheet-like form, and rolling-formation are exemplified.

[Lamination]

It is preferred that the laminate of the base layer (A) and the peelable surface layer (B) be stretched at least in the monoaxial direction after being laminated. Since the peelable surface layer (B) in the present invention is low in strength and thin in thickness, stretching of the peelable surface layer (B) as a monolayer is very difficult. It is possible to stretch the peelable surface layer (B) only when the base layer (A) and the peelable surface layer (B) are laminated.

Various well-known lamination methods can be used, e.g., a multilayer die method using feed block and multi-manifold and a lamination method using a plurality of dies are exemplified. It is also possible to use multilayer dies and extruding lamination in combination.

[Stretching]

The peelable surface layer (B) in the present invention is characterized in that the thickness is as thin as from 0.1 to 100 μm, and thinning of a thickness becomes easy by performing stretching.

Stretching can be done by any of ordinarily used various methods.

The temperature at stretching can be selected from the well-known range of from glass transition temperature or higher to melting point or lower of crystal portions suitable for thermoplastic resins. Specifically, when a propylene homopolymer (melting point: 155 to 167° C.) is used as the thermoplastic resin, the stretching temperature is from 100 to 164° C., and in the case of high density polyethylene (melting point: 121 to 134° C.), the stretching temperature is from 70 to 133° C., which are temperatures lower than melting points by 1 to 70° C. When polyethylene terephthalate (melting point: 246 to 252° C.) is used, the temperature at which crystallization does not proceed abruptly is selected. The stretching velocity is preferably from 20 to 350 m/min.

When a cast molded film is subjected to stretching, stretching is performed by longitudinal stretching making use of the difference between the peripheral speeds of rolls, transverse stretching using a tenter oven, calendering, and simultaneous biaxial stretching by combination of a tenter oven and a linear motor. As the stretching method of an inflation film, simultaneous biaxial stretching by a tubular method can be exemplified.

Stretching ratios are not particularly limited and are suitably decided taking the characteristics of thermoplastic resins into consideration. For example, when a propylene homopolymer or a copolymer thereof is used as the thermoplastic resin and stretched in one direction, the stretching ratio is from 1.2 to 12 times, preferably from 2 to 10 times, and when biaxially stretched, from 1.5 to 60 times in terms of area, preferably from 4 to 50 times. When other thermoplastic resins are used and stretched in one direction, the stretching ratio is from 1.2 to 10 times, preferably from 2 to 5 times, and when biaxially stretched, from 1.5 to 20 times in terms of area, preferably from 4 to 12 times.

The thus-obtained laminated film has many micro voids having a void ratio of from 10 to 60%, preferably from 20 to 45%, which is computed according to the following equation (1), inside the film. By the presence of voids, the film becomes more flexible as compared with multilayer-stretched films free of voids. Further, there is an intimate relationship between the void ratio and the later-described peeling strength, and it is possible to reduce the peeling strength of the peelable surface layer (B) by heightening the void ratio of the peelable surface layer (B).

$$\text{Void ratio (\%)} = (p^0 - p^1)/p^0 \times 100 \quad \text{equation (1)}$$

wherein $p^0$ is the density of film before stretching, and $p^1$ is the density of film after stretching.

[Peeling Strength]

Easily peelable laminated film (i) is conditioned in a thermostatic chamber (temperature: 20° C., relative humidity: 65%) for 12 hours, and then a pressure-sensitive adhesive tape (trade name: Cello-Tape, manufactured by Nichiban Co., Ltd.) is adhered on the peelable surface layer (B), which is cut out in a size of 10 mm in width and 100 mm in length, the pressure-sensitive adhesive tape is peeled at a tensile velocity of 300 mm/min. and an angle of 180° by a tensile tester AUTOGRAPH (manufactured by Shimadzu Corporation), and the stress of the time when peeling of the peelable surface layer (B) is stable is measured as the peeling strength by a load cell. The peeling strength according to the present invention is preferably from 5 to 150 g/cm, more preferably from 10 to 100 g/cm, still more preferably 20 to 80 g/cm. When the peeling strength is less than 5 g/cm, a problem arises such that peeling easily occurs at feeding and delivery of a film in the secondary processing, e.g., printing, type writing, cutting and the like. When the peeling strength exceeds 150 g/cm, the peelable surface layer (B) is not peeled off or the stress required for peeling should be heightened, thus it is not practicable. Further, material fracture occurs at places other than the peelable surface layer (B) and peeled surface becomes fluffy.

[Opaqueness]

Opaqueness is the value expressing the ratio of the reflectance of light (black plate/white plate) in percentage with applying black and white standard plates respectively to the back of measurement in conformity to JIS-P-8138.

The opaqueness of easily peelable laminated film (i) in the present invention is preferably from 60 to 100%, more preferably from 70 to 100%, and still more preferably from 85 to 100%. When the opaqueness is less than 60%, the informations to be protected are seen through a label when easily peelable laminated film (i) is used as a concealing seal, and the desired effect of the invention cannot be exhibited.

[Formation of Pressure-Sensitive Adhesive Layer]

A pressure-sensitive adhesive layer can be provided on the side of the peelable surface layer (B) opposite to the base layer (A) of the easily peelable laminated film (i) of the invention (i.e., next to the peelable surface layer or next to the protective layer, if provided), if desired.

By providing a pressure-sensitive adhesive layer on an easily peelable laminated film, an easily peelable laminated label (ii) can be obtained.

As such pressure-sensitive adhesives, rubber-based pressure-sensitive adhesives, acryl-based pressure-sensitive adhesives and silicon-based pressure-sensitive adhesives are representative. Specific examples of rubber-based pressure-sensitive adhesives include polyisobutylene rubber, butyl rubber and mixtures thereof, and pressure-sensitive adhesives obtained by blending these rubber-based pressure-sensitive adhesives with a tackifier, e.g., abietic acid rosin ester, a terpene-phenol copolymer, or a terpene-indene copolymer. Specific examples of acryl-based pressure-sensitive adhesives include those having a glass transition temperature of −20° C. or less, e.g., a 2-ethylhexyl acrylate-n-butyl acrylate copolymer and a 2-ethylhexyl acrylate-ethyl acrylate-methyl methacrylate copolymer.

As the types of these pressure-sensitive adhesives, a solvent-type, an emulsion-type and a hot melt-type are used. In general, a pressure-sensitive adhesive layer is laminated by coating a solvent-type or emulsion-type adhesive.

Coating is performed by means of a roll coater, a blade coater, a bar coater, an air knife coater, a gravure coater, a reverse coater, a die coater, a lip coater, a spray coater, or a comma coater and, if necessary, smoothing is performed, and a pressure-sensitive adhesive layer is formed through drying.

A pressure-sensitive adhesive layer is generally formed by coating a pressure-sensitive adhesive on a release paper, which is described later, and easily peelable laminated film (i) is laminated thereon, but according to the case, a pressure-sensitive adhesive may be directly coated on easily peelable laminated film (i).

The coating amount of the pressure-sensitive adhesive is not particularly restricted but is in general from 3 to 60 g/m², preferably from 10 to 40 g/m². Further, it is preferred that the peeling strength in the pressure-sensitive adhesive layer is from 200 to 3,000 g/20 mm.

When the adhesive strength between easily peelable laminated film (i) and the pressure-sensitive adhesive is small, it is preferred to coat an anchor coating agent on the back surface of the laminated film before coating a pressure-sensitive adhesive.

As the anchor coating agents, polyurethane, polyisocyanate, polyether polyol, polyisocyanate-polyester polyol-polyethyleneimine, alkyl titanate, etc., can be used, and these anchor coating agents are generally used by being dissolved in an organic solvent, e.g., methanol, ethyl acetate, toluene, hexane, etc., or water.

The coating amount of anchor coating agents is from 0.01 to 5 g/m² in terms of solid content after coating and drying, preferably from 0.02 to 2 g/m².

[Release Paper]

If necessary, a release paper can also be provided on the outer side of the adhesive layer in the easily peelable laminated label (ii).

The side in contact with the pressure-sensitive adhesive layer of the release paper which is provided on easily peelable laminated film (i) with the pressure-sensitive adhesive layer is generally subjected to silicon treatment to improve the peelability from the pressure-sensitive adhesive layer.

Generally used release papers can be used in the invention, e.g., wood free paper and kraft paper as they are, or subjected to calendering process, coated with a resin, or laminated with a film, and glassine paper, coated paper and plastic film subjected to silicon treatment can be used.

[Coat Layer]

It is also possible to provide a coat layer on at least one side of the surface of the easily peelable laminated film (i) of the present invention for further improving various printing or type writing aptitudes.

As such coat layers, as for coat layers suitable for commercial printing, e.g., offset printing, gravure printing, flexographic printing, screen printing and letter press printing, the combinations of well-known pigments and binders for well-known printing inks, as for the coat layers for heat-sensitive recording paper, the combinations of well-known leuco dyes and developers, as for the coat layers for ink-jet recording paper, the combinations of water-soluble resins, emulsion binders, water absorptive pigments and ink fixers of cationic substances, and as for the coat layers for melting type heat transfer recording paper, the combinations of well-known lipophilic pigments and various kinds resin binders are exemplified.

These coat layers can be manufactured according to well-known methods, and as the specific example, e.g., a roll coater, a blade coater, a bar coater, an air knife coater, a gravure coater, a reverse coater, a die coater, a lip coater, a spray coater and a comma coater are exemplified.

The manufacture of a coat layer may be performed by multistage of two or more stages, if necessary.

[Printing, Type Writing]

It is also possible to print or type-write a trade name, a manufacturer, eatable limit, the drawing of a character, an entry column, bar code, etc., on the front surface and back surface of easily peelable laminated film (i), if necessary.

Printing or typewriting may be performed in the state of a simple substance of an easily peelable laminated film or may be performed after an easily peelable label structure is formed by applying a release paper.

[Peeling Start Stress]

A test piece is cut from easily peelable laminated label (ii) in a size of 10 mm in width and 100 mm in length. Wood free paper having a thickness of 100 μm is adhered on the end of the test piece 30 mm in the lengthwise direction and wholly in the widthwise direction to make a chucking allowance, and an aluminum plate having a width of 20 mm, a length of 110 mm and a thickness of 1 mm is adhered thereon so that the test piece is not forced out. The prepared sample is conditioned in a thermostatic chamber (temperature: 20° C., relative humidity: 65%) for 12 hours, and then the test piece and the aluminum plate are peeled at a tensile velocity of 300 mm/min. and an angle of 180° by a tensile tester AUTOGRAPH (manufactured by Shimadzu Corporation), and the stress is measured by a load cell. The maximum stress value is taken as the peeling start stress. The peeling start stress in the present invention is preferably 500 g/cm or less, more preferably 10 to 400 g/cm, further preferably 20 to 350 g/cm. When the peeling start stress is higher than 500 g/cm, surface fracture of the object material to which the peelable laminated label (ii) is adhered occurs, as a result, peeling is not propagated to the peelable surface layer (B) or the easily peelable laminated film (i) is deformed and not practicable.

EXAMPLE

The present invention is further specifically described with reference to the following examples, comparative example and test example, but the present invention should not be construed as being limited thereto. The materials, use amounts, ratios and operations can be modified so long as they do not depart from the spirit of the present invention. Accordingly, the scope of the present invention is not limited to the specific examples shown below.

In the following, the thermoplastic resin compositions for use in the present invention are shown collectively in Table 1 below.

TABLE 1

| Name of Material | Content |
| --- | --- |
| Thermoplastic resin composition a | A thermoplastic resin composition obtained by kneading in an extruder set at 230° C. a composition obtained by blending a mixture comprising 70 wt % of a propylene homopolymer (Novatec PP:FY4, manufactured by Japan Polychem Corporation) having MFR of 5 g/10 min (230° C., load: 2.16 kg) and 20 wt % of high density polyethylene (Novatec HD:HJ360, manufactured by Japan Polychem Corporation) having MFR of 5.5 g/min (190° C., load: 2.16 kg) with 10 wt % of calcium carbonate (Softon 1800, manufactured by Shiraishi Calcium Kaisha Ltd.) having an average particle size of 1.2 μm |
| Thermoplastic resin composition b | A thermoplastic resin composition obtained by kneading in an extruder set at 230° C. a composition obtained by blending a mixture comprising 70 wt % of a propylene homopolymer (Novatec PP:FY4, manufactured by Japan Polychem Corporation) having MFR of 5 g/10 min (230° C., load: 2.16 kg) and 10 wt % of high density polyethylene (Novatec HD:HJ360, manufactured by Japan Polychem Corporation) with 20 wt % of calcium carbonate (Softon 1800, manufactured by Shiraishi Calcium Kaisha Ltd.) having an average particle size of 1.2 μm |

TABLE 1-continued

| Name of Material | Content |
| --- | --- |
| Thermoplastic resin composition c | A thermoplastic resin composition obtained by kneading in an extruder set at 230° C. a composition obtained by blending a mixture comprising 60 wt % of a propylene homopolymer (Novatec PP:FY4, manufactured by Japan Polychem Corporation) having MFR of 5 g/10 min (230° C., load: 2.16 kg) and 10 wt % of high density polyethylene (Novatec HD:HJ360, manufactured by Japan Polychem Corporation) with 30 wt % of calcium carbonate (Softon 1800, manufactured by Shiraishi Calcium Kaisha Ltd.) having an average particle size of 1.2 μm |
| Thermoplastic resin composition d | A thermoplastic resin composition obtained by kneading in an extruder set at 230° C. a composition obtained by blending 60 wt % of a propylene homopolymer (Novatec PP:MA3, manufactured by Japan Polychem Corporation) having MFR of 11 g/10 min (230° C., load: 2.16 kg) with 40 wt % of calcium carbonate (Softon 1800, manufactured by Shiraishi Calcium Kaisha Ltd.) having an average particle size of 1.2 μm |
| Thermoplastic resin composition e | A thermoplastic resin composition obtained by kneading in an extruder set at 230° C. a composition obtained by blending 50 wt % of a propylene homopolymer (Novatec PP:MA3, manufactured by Japan Polychem Corporation) having MFR of 11 g/10 min (230° C., load: 2.16 kg) with 50 wt % of calcium carbonate (Softon 1800, manufactured by Shiraishi Calcium Kaisha Ltd.) having an average particle size of 1.2 μm |
| Thermoplastic resin composition f | A thermoplastic resin composition obtained by kneading in an extruder set at 230° C. a composition obtained by blending 40 wt % of a propylene homopolymer (Novatec PP:MA3, manufactured by Japan Polychem Corporation) having MFR of 11 g/10 min (230° C., load: 2.16 kg) with 60 wt % of calcium carbonate (Softon 1800, manufactured by Shiraishi Calcium Kaisha Ltd.) having an average particle size of 1.2 μm |

Example 1

After each of thermoplastic resin composition d as layer (B), thermoplastic resin composition b as layer (A1), and thermoplastic resin composition c as layer (A2) was kneaded in each extruder set at 230° C., they were supplied to a co-extrusion die set at 250° C., laminated in the die and extruded in a sheet. The laminate was cooled by a cooler, thereby a three-layer unstretched sheet was obtained. The unstretched sheet was heated at 130° C. and stretched 5 times in the machine direction.

The above sheet was cooled to a temperature of 60° C., again heated to a temperature of 150° C. and stretched 8.0 times in the transverse direction in a tenter oven, subjected to annealing treatment at a temperature of 162° C., cooling at 60° C., and corona discharge treatment, and then trimming, thereby a laminated film of a three-layer structure [(B)/(A1)/(A2): 1/49/10 μm in thickness, stretched layer constitution: biaxial/biaxial/biaxial] having a thickness of 60 μm, a peeling strength of 25 g/cm, and an opaqueness of 91% was obtained.

Example 2

After each of thermoplastic resin composition d as layer (B) and thermoplastic resin composition b as layer (A1) was kneaded in each extruder set at 230° C., they were supplied to a co-extrusion die set at 250° C., laminated in the die and extruded in a sheet. The laminate was cooled by a cooler, thereby a two-layer unstretched sheet was obtained. The unstretched sheet was heated at 130° C. and stretched 4 times in the machine direction.

Thermoplastic resin composition b as layer (A2) was kneaded in an extruder set at 250° C. and extruded in a sheet, and this sheet was laminated on the above-prepared 4 time-stretched film (A1), thereby a three-layer structure laminated film was obtained. The three-layer structure laminated film was cooled to a temperature of 60° C., again heated to about 160° C. by a tenter oven and stretched 7.5 times in the transverse direction, subjected to annealing treatment in a heat-set zone adjusted to 165° C., cooling at 60° C., and then trimming, thereby a laminated film of a three-layer structure [(B)/(A1)/(A2): 1/49/30 µm in thickness, stretched layer constitution: biaxial/biaxial/monoaxial] having a thickness of 80 µm, a peeling strength of 40 g/cm, and an opaqueness of 88% was obtained.

Example 3

After each of thermoplastic resin composition f as layer (B), thermoplastic resin composition b as layer (A1), and thermoplastic resin composition c as layer (A2) was kneaded in each extruder set at 240° C., they were supplied to a co-extrusion die set at 270° C., laminated in the die and extruded in a sheet. The laminate was cooled by a cooler, thereby a three-layer unstretched sheet was obtained. The unstretched sheet was heated at 120° C. and stretched 5 times in the machine direction, subjected to annealing treatment at 160° C., corona discharge treatment, and then trimming, thereby a laminated film of a three-layer structure [(B)/(A1)/(A2): 4/46/10 µm in thickness, stretched layer constitution: monoaxial/monoaxial/monoaxial] having a thickness of 60 µm, a peeling strength of 90 g/cm, and an opaqueness of 87% was obtained.

Example 4

After each of thermoplastic resin composition c as layer (B) and thermoplastic resin composition b as layer (A1) was kneaded in each extruder set at 220° C., they were supplied to a co-extrusion die set at 240° C., laminated in the die and extruded in a sheet. The laminate was cooled by a cooler, thereby a two-layer unstretched sheet was obtained. The unstretched sheet was heated at 140° C. and stretched 4 times in the machine direction.

After each of thermoplastic resin composition d as layer (A2) and thermoplastic resin composition e as layer (A3) was kneaded in each extruder set at 250° C., they were supplied to a co-extrusion die set at 250° C., laminated in the die and extruded in a sheet, and this sheet was laminated on the above-prepared 4 time-stretched film (A1), thereby a four-layer structure laminated film was obtained. The four-layer structure laminated film was cooled to a temperature of 60° C., again heated to about 160° C. by a tenter oven and stretched 7.5 times in the transverse direction, subjected to annealing treatment in a heat-set zone adjusted to 170° C., cooling at 60° C., and then trimming, thereby a laminated film of a four-layer structure [(B)/(A1)/(A2)/(A3): 1/39/100/10 µm in thickness, stretched layer constitution: biaxial/biaxial/monoaxial/monoaxial] having a thickness of 150 µm, a peeling strength of 130 g/cm, and an opaqueness of 66% was obtained.

Example 5

Thermoplastic resin composition b as layer (A2) was kneaded in an extruder set at 250° C., supplied to a die set at 250° C., extruded in a sheet, and the sheet was cooled by a cooler, thereby a monolayer unstretched sheet was obtained. The unstretched sheet was heated at 135° C. and stretched 4 times in the machine direction.

After each of thermoplastic resin composition f as layer (B) and thermoplastic resin composition b as layer (A1) was kneaded in each extruder set at 230° C., they were supplied to a co-extrusion die set at 240° C., laminated in the die and extruded in a sheet, and this sheet was laminated on the above-prepared 4 time-stretched film (A2), further, thermoplastic resin composition d as layer (A3) was kneaded in an extruder set at 240° C., and extruded in a sheet, and this sheet was laminated on the opposite side of the above-prepared 4 time-stretched film (A2), thereby a four-layer structure laminated film was obtained. The four-layer structure laminated film was cooled to 60° C., again heated to about 120° C. by a tenter oven and stretched 8.0 times in the transverse direction, subjected to annealing treatment in a heat-set zone adjusted to 160° C., cooling at 60° C., and then trimming, thereby a laminated film of a four-layer structure [(B)/(A1)/(A2)/(A3): 3/70/57/70 µm in thickness, stretched layer constitution: monoaxial/monoaxial/biaxial/monoaxial] having a thickness of 200 µm, a peeling strength of 140 g/cm, and an opaqueness of 95% was obtained.

Example 6

Thermoplastic resin composition a as layer (A1) was kneaded in an extruder set at 230° C., supplied to a die set at 250° C., extruded in a sheet, and the sheet was cooled by a cooler, thereby an unstretched sheet was obtained.

Thermoplastic resin composition e as layer (B) was kneaded in an extruder set at 240° C., and extruded from a die set at 270 degrees C., and laminated on the above-prepared unstretched sheet, thereby a two-layer structure laminated sheet was obtained. The two-layer structure laminated unstretched sheet was heated at a temperature of 120° C. and stretched 5 times in the machine direction, subjected to annealing treatment at 140° C., corona discharge treatment, and then trimming, thereby a laminated film of a two-layer structure [(B)/(A1): 7/93 µm in thickness, stretched layer constitution: monoaxial/monoaxial] having a thickness of 100 µm, a peeling strength of 110 g/cm, and an opaqueness of 85% was obtained.

Example 7

After each of thermoplastic resin composition a as a protective layer, thermoplastic resin composition c as layer (B), thermoplastic resin composition a as the layer (A1), and thermoplastic resin composition b as the layer (A2) was kneaded in each extruder set at 230° C., they were supplied to a co-extrusion die set at 250° C., and laminated in the die and extruded in a sheet. The laminated sheet was cooled by a cooler, thereby a four-layer unstretched sheet was obtained. The unstretched sheet was heated at 120° C. and stretched 5 times in the machine direction, and then cooled to 60° C. The sheet was again heated to about 140° C. by a tenter oven and stretched 8 times in the transverse direction, and subjected to annealing treatment in a heat-set zone adjusted to 160° C., cooling at 60° C., corona discharge treatment, and then trimming, thereby a laminated film of a four-layer structure [protective layer/(B)/(A1)/(A2): 1/39/90/10 µm in thickness, stretched layer constitution: biaxial/biaxial/biaxial/biaxial] having a thickness of 140 µm, a peeling strength of 25 g/cm, and an opaqueness of 95% was obtained.

Comparative Example 1

After each of thermoplastic resin composition d as layer (B), thermoplastic resin composition b as layer (A1), and thermoplastic resin composition c as layer (A2) was kneaded in each extruder set at 240° C., they were supplied to a co-extrusion die set at 260° C., laminated in the die and extruded in a sheet. The laminate was cooled by a cooler, thereby a three-layer unstretched sheet was obtained. The unstretched sheet was heated at 140° C. and stretched 4 times in the machine direction, subjected to annealing treatment at 160° C., corona discharge treatment, and then trimming, thereby a laminated film of a three-layer structure [(B)/(A1)/(A2): 4/46/10 μm in thickness, stretched layer constitution: monoaxial/monoaxial/monoaxial] having a thickness of 60 μm, a peeling strength of 200 g/cm, and an opaqueness of 67% was obtained.

Comparative Example 2

The easily peelable resin-stretched film disclosed in Example 1 in Japanese Patent Laid-Open No. 258476/1998 was used.

<Test Example>

A release paper comprising wood free paper having a thickness of 173 μm and density of 0.9 g/m³ both surfaces of which were laminated with a polyethylene film and one surface of which was treated with silicon was prepared. A pressure-sensitive adhesive "Oribain" BPS-1109 (trade name, manufactured by TOYO INK MFG CO., LTD.) was coated on the silicon-treated surface of the release paper in a solid content of 25 g/m² by means of a comma coater and dried, thereby a pressure-sensitive adhesive layer was obtained. The pressure-sensitive adhesive layer was laminated on each of the easily peelable laminated films (i) prepared in the above Examples and Comparative Examples so that the pressure-sensitive adhesive layer was in contact with the peelable surface layer (B) (or the protective layer, in the case of Example 7), thereby easily peelable label (ii) of laminated structure comprising an easily peelable laminated film/a pressure-sensitive adhesive layer/a release paper was obtained. The peeling start stress of each easily peelable label (ii) was measured according to the above method.

(Peelability)

A sample of each easily peelable label (ii) was cut out in a square of 5 cm×5 cm, the release paper was peeled off from the label, and the easily peelable label was stuck on a Japanese official post card, and the peelability was evaluated.

(1) Peeling Starting Property

One side of the four sides of the easily peelable label (easily peelable laminated film/pressure-sensitive adhesive layer) was taken with fingers and peeled off from the postcard. The state until peeling of the peelable surface layer (B) started was observed and evaluated according to the following four grades, when the base layer (A) was peeled off from the post card.

Good (◉): Peeling started immediately.
A little good (o): 2 mm or more was required to start peeling.
A little bad (Δ): Peeling started partially (i.e., 2 mm or more and less than 10 mm was required to start peeling, and the peeling start portion has an uneven surface).
Bad (x): 10 mm or more was required to start peeling.

(2) Propagation of Peeling

A pressure-sensitive adhesive tape (trade name: Cello-Tape, manufactured by Nichiban Co., Ltd.) was adhered on one side of the four sides of the base layer (A) in the easily peelable label to make it easy to start peeling of the peelable surface layer (B), when the base layer (A) was peeled off from the post card. The base layer (A) was peeled off from the post card and the state of propagation of the peelable surface layer (B) and the peeling force were evaluated according to the following four grades.

Good (◉): Peeling force was light and peeling was propagated to the surface throughout.
A little good (o): Peeling force was a little heavy but peeling was propagated to the surface throughout.
A little bad (Δ): Peeling force was very heavy but peeling was propagated to the surface throughout.
Bad (x): Peeling could not be propagated to the surface at all and the base layer (A) tore on the way.

(Information-Concealing Property)

Twenty six letters of the alphabet of the letter size of 10 points were typed on a Japanese official post card. After peeling off the release paper from a sample of each of the easily peelable labels, the easily peelable label was stuck on the typed alphabet letters. The information-concealing property of the easily peelable label was visually judged from the letters seen through the easily peelable label and evaluated according to four grades of good (◉), a little good (o), a little bad (Δ), and Bad (x).

Good (◉): It was impossible to recognize the letters (characters).
A little good (o): It was possible to see the presence of the letters through the easily peelable label very slightly, but it was impossible to recognize them as letters.
A little bad (Δ): It was possible to see the presence of the letters through the easily peelable label while they were not so clear, and it was possible to recognize part of the letters.
Bad (x): It was possible to clearly recognize all of the letters.

(Information-Recognizing Property)

Bar code (CODE39) was printed on a synthetic paper (trade name: "VES85", manufactured by Yupo Corporation) by means of a bar code printer (trade name: "B30", manufactured by TEC) to thereby prepare an exact sample for bar code-reading.

The release paper was peeled off from a sample of each of the easily peelable labels, the easily peelable label was stuck on the bar code on the synthetic paper, and ten samples whose bar codes were concealed were prepared. Each of the bar codes after peeling off the base layer (A) of the easily peelable label was read with a bar code reader (LASERCHEK II, manufactured by Fuji Denki Reiki Co., Ltd.), and the number of times which succeeded in recognizing bar code was evaluated according to the following four grades.

Good (◉): Succeeded 10 times.
A little good (o): Succeeded from 8 to 9 times.
A little bad (Δ): Succeeded from 2 to 7 times.
Bad (x): Succeeded 1 time or less.

The results obtained are shown in Table 2 below.

TABLE 2

| | Easily Peelable Laminated Film | | | | | | | | |
|---|---|---|---|---|---|---|---|---|---|
| | Thickness (μm) | | | Stretched Layer Constitution | | Amount of Fine Powder (%) | | Peeling Strength (layer (B) surface) (g/cm) | Opaqueness (%) |
| Example No. | Entire | Layer (B) | Layer (A) (A1/A2/A3) | Layer (B) | Layer (A) (A1/A2/A3) | Layer (B) | Layer (A) (A1/A2/A3) | | |
| Ex. 1 | 60 | 1 | 49/10 | biaxial | biaxial/biaxial | 40 | 20/30 | 25 | 91 |
| Ex. 2 | 80 | 1 | 49/30 | biaxial | biaxial/monoaxial | 40 | 20/20 | 40 | 88 |
| Ex. 3 | 60 | 4 | 46/10 | monoaxial | monoaxial/monoaxial | 60 | 20/30 | 90 | 87 |
| Ex. 4 | 150 | 1 | 39/100/10 | biaxial | biaxial/monoaxial/monoaxial | 30 | 20/40/50 | 130 | 66 |

TABLE 2-continued

| Example No. | | | | | | | | | |
|---|---|---|---|---|---|---|---|---|---|
| Ex. 5 | 200 | 3 | 70/57/70 | monoaxial | monoaxial/biaxial/monoaxial | 60 | 20/20/40 | 140 | 95 |
| Ex. 6 | 100 | 7 | 93 | monoaxial | monoaxial | 50 | 10 | 110 | 85 |
| Ex. 7 | 140 | 39 | 90/10 | biaxial | biaxial/biaxial | 30 | 10/20 | 25 | 95 |
| Comp. Ex. 1 | 60 | 4 | 46/10 | monoaxial | monoaxial/monoaxial | 40 | 20/30 | 200 | 67 |
| Comp. Ex. 2 | — | — | — | — | — | — | — | — | 91 |

| | Peeling Start | Item of Evaluation | | | |
|---|---|---|---|---|---|
| | | Peelability | | | |
| Example No. | Stress (g/cm) | Starting property | Propagation | Information-Concealing Property | Information-recognizing property |
| Ex. 1 | 70 | ◉ | ◉ | ◉ | ◉ |
| Ex. 2 | 90 | ◉ | ◉ | ◉ | ◉ |
| Ex. 3 | 210 | ◉ | ◉ | ◉ | ◉ |
| Ex. 4 | 250 | O | o | o | ◉ |
| Ex. 5 | 310 | O | o | ◉ | ◉ |
| Ex. 6 | 280 | O | o | ◉ | ◉ |
| Ex. 7 | 190 | ◉ | ◉ | ◉ | o |
| Comp. Ex. 1 | 530 | X | x | o | ◉ |
| Comp. Ex. 2 | — | X | ◉ | ◉ | ◉ |

Industrial Applicability

The easily peelable laminated film according to the present invention requires no specific processing to start peeling, and the peelable surface layer (B) can be peeled off with light force. Therefore, the easily peelable laminated film in the invention can be used for various uses, such as delivery slips, concealing seals, labels for preventing re-pasting, seals for preventing alteration, application seals, coupons, etc.

The invention claimed is:

1. A peelable laminated label (ii) comprising:
a peelable laminated film (i) having an opaqueness of from 60 to 100%, which comprises a laminate of a peelable surface layer (B) having a thickness of from 1 to 7 μm, a peeling strength of from 5 to 150 g/cm and containing from 10 to 80 wt % of an inorganic fine powder and/or an organic fine powder and from 90 to 20 wt % of a thermoplastic resin, and a base layer (A) comprising a thermoplastic resin; and
a pressure-sensitive adhesive directly provided on the surface of the peelable surface layer (B); wherein
both of the tensile strength and the tear strength of base layer (A) are respectively stronger than the tensile strength and the tear strength of peelable surface layer (B).

2. The peelable laminated label (ii) as claimed in claim 1, wherein the peelable surface layer (B) is a stretched film.

3. The peelable laminated label (ii) as claimed in claim 1, wherein the base layer (A) and the peelable surface layer (B) are stretched at least in a monoaxial direction after being laminated.

4. The peelable laminated label (ii) as claimed in claim 1, wherein the peelable surface layer (B) comprises a thermoplastic resin.

5. The peelable laminated label (ii) as claimed in claim 1, wherein the base layer (A) has a layer thickness of from 10 to 500 μm.

6. The peelable laminated label (ii) as claimed in claim 1, wherein the base layer (A) has a laminated structure (A1)/(A2); the structure of a layer (A1) contiguous to the peelable surface layer (B) in the laminated structure comprises a thermoplastic resin film containing from 2 to 60 wt % of an inorganic fine powder and/or an organic fine powder, and from 98 to 40 wt % of a thermoplastic resin; the content of the inorganic fine powder and/or the organic fine powder in the layer (A1) is less than that in the peelable surface layer (B) by 8 wt % or more; and an outer layer (A2) on the surface of layer (A1) opposite to the peelable surface layer (B) comprises a thermoplastic resin film containing from 0 to 80 wt % of an inorganic fine powder and/or an organic fine powder, and from 100 to 20 wt % of a thermoplastic resin.

7. The peelable laminated label (ii) as claimed in claim 1, wherein a coat layer is provided on the exposed side of the base layer (A) of the peelable laminated film (i).

8. A peelable laminated label (ii) comprising:
a peelable laminated film (i) which comprises laminate of a peelable surface layer (B) having a thickness of from 1 to 7 μm and a peeling strength of from 5 to 150 g/cm, and a base layer (A) comprising a thermoplastic resin; and
a pressure-sensitive adhesive and a release paper, in this order directly provided on the surface of the peelable surface layer (B); wherein
both of the tensile strength and the tear strength of base layer (A) are respectively stronger than the tensile strength and the tear strength of peelable surface layer (B).

9. The peelable laminated label (ii) as claimed in claim 1, wherein the peeling start stress is 500 g/cm or less.

10. The peelable laminated label (ii) as claimed in claim 1, wherein letters or graphic data are provided under the peelable surface layer (B) or the pressure-sensitive adhesive and are recognizable by peeling the base layer (A) off from the peelable laminated label (ii).

11. The peelable laminated label (ii) as claimed in claim 1, wherein the thermoplastic resin in the peelable surface layer (B) is a polyolefin.

12. The peelable laminated label (ii) as claimed in claim 8, wherein the thermoplastic resin in the peelable surface layer (B) is a polyolefin.

* * * * *